United States Patent [19] [11] 3,790,282
Fielding [45] Feb. 5, 1974

[54] FLAME-IN-ENGINE PHOTOMETER DETECTOR AND ALARM FOR PHOSPHORUS AND OTHER ELEMENTS

[75] Inventor: George H. Fielding, Alexandria, Va.

[73] Assignee: The United States of America as represented by the Secretary of the Navy, Washington, D.C.

[22] Filed: Mar. 23, 1972

[21] Appl. No.: 237,428

[52] U.S. Cl. ................................. 356/86, 356/87
[51] Int. Cl. ........................................... G01j 3/30
[58] Field of Search .............................. 356/85–87

[56] References Cited
UNITED STATES PATENTS
3,067,610 12/1962 Bockemuehl et al. ............ 356/43 X
3,516,745 6/1970 Schuman ............................. 356/85
3,198,062 8/1965 Chaffee ......................... 356/87 UX
3,672,774 6/1972 Bojic et al. ......................... 356/86

Primary Examiner—Ronald L. Wibert
Assistant Examiner—F. L. Evans
Attorney, Agent, or Firm—R. S. Sciascia et al.

[57] ABSTRACT

An apparatus and method for determining the concentration of pollutants in air by exciting atoms of the pollutant in a pressure chamber and measuring the intensity of the characteristic light emitted by the excited atoms.

8 Claims, 1 Drawing Figure

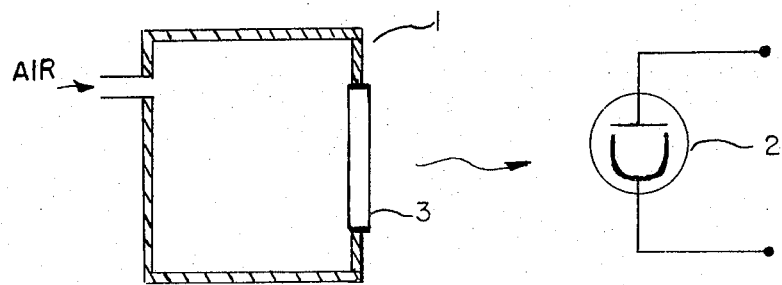

FLAME-IN-ENGINE PHOTOMETER DETECTOR AND ALARM FOR PHOSPHORUS AND OTHER ELEMENTS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

In recent years much concern has developed over the problem of pollution. Phosphorus and other elements in compounds used as aerosols and gases for agricultural, industrial and scientific applications have polluted the atmosphere. Before any attempt can be made to remove these pollutants from the air, an apparatus and a method for their detection must be conceived.

Present methods for detection or analysis of toxic phosphorus pesticides and other compounds require the use of (a) enzymatic analyses in a laboratory, (b) gas-chromatographic analyses in a laboratory, or (c) the use of the Geuter approach in a laboratory instrument such as a Melpar device. It should be noted that the above methods are not suitable for use in the field, but only for use in the laboratory.

When atoms of toxic compounds such as phosphorus and sulphur undergo excitation, a characteristic light is emitted. For example, the burning of phosphorus emits a green light. A known technique for detecting the presence of phosphorus is to burn a phosphorus compound at atmospheric pressure in an organic solution with a hydrogen burner, and measure the intensity of the green light emitted. When this technique was attempted with tributyl phosphate and similar compounds dissolved in either ethanol or kerosene, it was found to have a detection limit in the range of $1-8 \times 10^{-4}$ molar. In terms of concentration of airborne materials, this sensitivity figure corresponds to one microgram of phosphorus per liter of air. Sensitivity of this order is less than is required for maximum usefulness in field or laboratory use. A sensitivity at least ten times that of the above technique is required to realistically determine the concentration of unwanted pollutants in the atmosphere. This invention relates to a method and apparatus to achieve that goal.

SUMMARY OF THE INVENTION

A method and apparatus for detecting pollutants in the air is disclosed. More specifically, the invention is directed towards improving the degree to which the amount of pollutant can be detected by exciting atoms of the pollutant under pressure.

STATEMENT OF THE OBJECTS OF THE INVENTION

It is an object of the invention to provide an apparatus and a method to improve the sensitivity to which air pollutants can be detected.

Another object of the invention is to provide an apparatus for detecting air pollutants which can be used in the field as well as the laboratory.

Other objects, advantages and novel features of the invention will become apparent from the following detailed description of the invention when considered in conjunction with the accompanying drawings wherein:

BRIEF DESCRIPTION OF THE DRAWINGS

The FIGURE shows diagrammatically an apparatus for the detection of pollutants. A combination of a pressure chamber and a photometric device is shown.

DETAILED DESCRIPTION

The invention relates to a method and apparatus to improve the degree to which unwanted air pollutants can be detected. In the FIGURE, 1 refers to a pressurized chamber in which atoms of the air-pollutant compounds are excited. 2 refers to a photometric device used to measure the intensity of the characteristic light emitted by the excited atoms. 3 represents a transparent window through which the light is transmitted.

The chamber is such that the pressure within said chamber can be maintained above one atmosphere. The chamber must also have a transparent window through which light will be transmitted. The window can be formed as a collimating or focussing lens, and thus used as such. Suitable materials from which the window may be produced are quartz, spinel ($MgAl_2O_4$), sapphire, periclase ($MgO$), and fluorite.

An ideal chamber is the cylinder of an operating single cylinder internal combustion engine, such as a miniature engine used for propelling model airplanes. An engine of any size may be used, however. The engine can have a transparent cylinder head or any other transparent window.

Any photometric device that is capable of measuring the intensity of the characteristic light can be used. For example, photocells and photomultipliers can both be used. However, photomultipliers require power sources which would increase the cost.

Atoms of the pollutant can be excited in two ways. In the first technique the atoms are excited by burning the pollutant with a fuel. Fuels suitable for use are hydrogen and liquefied petroleum gases, such as butane and propane. In the second technique the atoms are excited by a spark discharge. In both techniques the excited atoms emit a characteristic light whose intensity can be measured. From this intensity the concentration of the pollutant can easily be calculated.

In order the more fully understand this invention the following examples are disclosed.

EXAMPLE 1

An apparatus comprising a single cylinder internal combustion engine having a compression ratio of 10:1 and having a transparent window therein is set up in combination with a photometric device, such as a photocell.

Filtering means are used to filter out any light other than that of the characteristic light emitted by the pollutant. A dispersion device such as a prism or ruled grating may be used in place of a filter.

By burning a known concentration of a toxic phosphorus compound, the apparatus can be calibrated.

An unknown quantity of a toxic phosphorus compound is then burned within the engine using a propane torch cylinder as a fuel source. The intensity of the characteristic light emitted is then measured using the photocell and the concentrations of the phosphorus compound can be calculated. The amount of phosphorus that can be detected is about ten times that which can be detected at atmospheric pressure.

EXAMPLE 2

Using the same apparatus as Example 1 atoms of the phosphorus compounds are excited by a spark discharge without the addition of fuel. The intensity of the characteristic light emitted from the excited atoms of the phosphorus compound is then measured and the concentration of the phosphorus compound is calculated. The increase in sensitivity is also about ten fold.

It may also be desirable to improve the "signal-to-noise" ratio of the device. The "signal-to-noise" ratio is defined as the ratio of the intensity of the light emitted by the excited atoms of the pollutant-containing air to the intensity of the light emitted by the burning fuel alone and/or by impurities in the air, such as dust. This ratio may be improved in the following ways. A twin-cylinder internal combustion engine may be used in which the cylinders fire alternately. One cylinder is supplied with ambient air which has been purified in an aerosol filter plus an activated carbon bed. The second cylinder is supplied with air containing the pollutant. By measuring the intensity of the light emitted in each cylinder, the amount of "noise" found in the first cylinder is determined and can be subtracted from the "signal" found in the second cylinder. With the use of two photometric devices, one for each cylinder, the cylinders can fire simultaneously and both the "signal" and "noise" determined simultaneously. In either case the intensity of light due to the "noise" can be subtracted from that due to the "signal," yielding a more accurate measurement of light intensity due to the pollutant.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A method for determining the concentration of pollutants in air comprising:
   exciting the atoms of a pollutant found in the atmosphere by burning said pollutant with a fuel within a chamber having a transparent window therein;
   maintaining the pressure within said chamber above one atmosphere; and
   measuring the intensity of the light emitted by the excited atoms of the pollutant.

2. A method according to claim 1 wherein the fuel is hydrogen.

3. A method according to claim 1 wherein the fuel is a liquefied petroleum gas.

4. A method according to claim 3 wherein the liquefied petroleum gas is propane.

5. A method according to claim 1 wherein said pressure is maintained at about 10 atmospheres.

6. A method according to claim 1 wherein said step of burning occurs within an internal combustion engine.

7. A method for determining the concentration of pollutants in air comprising:
   exciting the atoms of a pollutant found in the atmosphere by subjecting said pollutants to a spark-discharge within a chamber having a transparent window therein;
   maintaining the pressure within said combustion chamber above one atmosphere; and
   measuring the intensity of the light emitted by the excited atoms of the pollutant.

8. A method according to claim 7 wherein said pressure is maintained at about 10 atmospheres.

* * * * *